United States Patent [19]

Sato

[11] 4,429,378
[45] Jan. 31, 1984

[54] OPTICAL PICKUP DEVICE FOR USE IN A VIDEO AND/OR AUDIO DISC PLAYER

[75] Inventor: Katsuharu Sato, Tokorozawa, Japan

[73] Assignee: Universal Pioneer Corporation, Tokyo, Japan

[21] Appl. No.: 249,338

[22] Filed: Mar. 31, 1981

[30] Foreign Application Priority Data

Mar. 31, 1980 [JP] Japan .................................. 55-42948

[51] Int. Cl.³ .............................................. G11B 7/00
[52] U.S. Cl. .................................... 369/110; 350/402
[58] Field of Search ................ 369/110, 122; 350/402

[56] References Cited

U.S. PATENT DOCUMENTS

3,969,576  7/1976  Boonstra ............................. 369/122
4,005,259  1/1977  Kaneko ................................ 369/122
4,100,577  7/1978  Naruse ................................. 369/110

FOREIGN PATENT DOCUMENTS

257066  4/1970  U.S.S.R. .............................. 350/402

OTHER PUBLICATIONS

"Integrated Autofocusing System and Method of Manufacture" by Gaston, IBM Technical Disclosure Bulletin, vol. 23, No. 5, Oct.1980, pp. 1906–1908.

*Primary Examiner*—Alan Faber
*Attorney, Agent, or Firm*—Michael J. Striker

[57] ABSTRACT

An optical pickup device is placed in a video and/or audio disc player operative to reproduce information recorded in the form of an optical pattern such as a train of pits on a recording disc, in which the direction of light beam emitted from a light source is parallel to the propagation path of light impinging onto and reflected from the recording disc toward a photosensor. A polarization prism is used to deflect the light from the light source toward the recording disc, which prism cooperates with a quarter wave plate to act as a beam splitter.

9 Claims, 5 Drawing Figures

OPTICAL PICKUP DEVICE FOR USE IN A VIDEO AND/OR AUDIO DISC PLAYER

FIELD OF THE INVENTION

The present invention relates to an optical pickup device for optically detecting an information recorded in the form of an optical pattern such as a series of pits or bosses on a recording medium. The optical pickup device herein proposed may be preferably used in an audio and/or video disc player.

BACKGROUND OF THE INVENTION

A recently developed optical video and/or audio disc player is adapted to play a recording medium in the form of a disc having thereon a helically wound train of discrete pits or the like representing video and/or audio information.

In order to pick up the information on the recording disc, the player has an optical pickup device which has a light source for generating a plane-polarized light beam to be directed toward the recording disc, and a photosensor for detecting the light originated from the light source and reflected from the recording surface of the recording disc. A polarizer prism is provided between the photosensor and the recording disc for deflecting the light from the light source toward the recording disc and passing therethrough the light reflected from the recording disc. A quarter wave plate is provided between the polarizer and the recording disc.

In a prior art optical pickup device of the abovementioned type, the light source means including a light emissive element and a concentrating lens must be situated largely apart from the path of light reflected from the recording disc to the photosensor and thus is so disposed as to project transversely to a considerable extent from the linearly disposed assembly constituted by the quarter wave plate, the polarizer and the photosensor. Therefore, the above-mentioned pickup device has a drawback that it has a considerably large dimension and requires a large space in the pickup device. In addition, the propagation direction of the light from the light source toward the polarizer is perpendicular to the propagation directions in the assembly of the three parts, namely, the wave plate, the polarizer and the photosensor, with the deleterious result that errors of mounting of the polarizer cause the reflecting angle to deviate and degrades the pickup characteristic of the device.

SUMMARY OF THE INVENTION

The present invention was made to eliminate the above drawbacks. It is thus the prime object of the present invention to provide an optical pickup device which is compact in construction.

It is another object of the present invention to provide an optical pickup device which can be fabricated precisely with negligible deviation of the propagation direction of light.

In order to achieve the above objects, an optical pickup device according to the present invention comprises light source means for generating a plane-polarized light beam having a polarization direction and directed to a first predetermined direction, a polarizer prism having a reflecting surface therein disposed in the path of the light beam so as to deflect the light beam to a second predetermined direction and having a polarizing plane therein which is inclined to the second predetermined direction and has such a polarizing property as to pass therethrough a light beam having a polarization direction different from that of the deflected light beam so that the deflected light beam is reflected at the polarizing plane toward a third predetermined direction, a quarter wave plate disposed transversely in the path of the light beam reflected at the polarizing plane of the polarizer prism, photosensor means disposed opposite to said quater wave plate with respect to said polarizing plane of the polarizer prism and in the third predetermined direction.

BRIEF DESCRIPTION OF THE DRAWINGS

The features and the advantages of a pickup device according to the present invention will be more clearly understood from the following description taken in conjunction with the accompanying drawings in which like reference numerals designate similar or corresponding parts or components and in which:

FIGS. 4 and 5 are sectional side views of other embodiments, respectively corresponding to those of FIGS. 2 and 3.

DESCRIPTION OF A PRIOR ART

Figure 1:
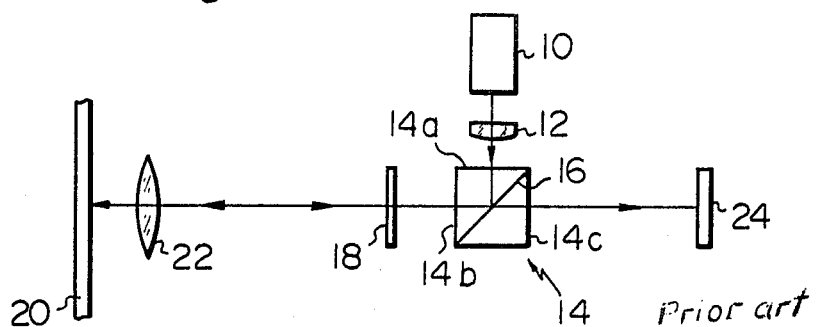
FIG. 1 is a schematic sectional side view of a prior art optical pickup device.

In FIG. 1 there is shown a prior art optical pickup device which comprises a light source 10. The light source 10 may be preferably made of a semiconductor laser device. The light source 10 emits a light beam which is polarized in only one plane parallel to propagation direction thereof. The light beam from the light source 10 passes through a concentrating lens 12 and enters a side surface 14a of a polarizing prism 14. The surface 14a is perpendicular to the propagation direction of the light beam passed through the concentrating lens 12. The light beam enterred the prism 14 is reflected at an oblique polarizing plane or surface 16 to a front surface 14b of the prism 14 the polarizing plane 16 is coated with a suitable material. The surfaces 14a and 14b are perpendicular to each other and the polarization surface 16 is inclined from those surfaces 14a and 14b by 45°, respectively. The reflected light beam passes through the side surface 14b and enters a quarter wave plate 18 which passes therethrough the light beam. The quarter wave plate 18 applies a phase shift to the light beam passing therethrough so that the light beam passed through the quarter wave plate 18 contains two components respectively shifted in phase from the original light beam ±45°. The light beam passed through the quater wave plate 18 is concentrated onto a recording surface of recording disc 20 by means of an object lens 22. The light beam concentrated onto the recording disc 20 is reflected from the disc 20 and returns along the same propagation path through the object lens 22 and the quarter wave plate 18 to the polarization surface 16 of the prism 14. The returned light beam is polarized in a direction shifted by 90° from the direction in which the original light beam emitted from the light source 10 is polarized so that the returned light beam passes through the polarization surface 16 and passes through a rear surface 14c. The light beam passed through the rear surface 14c enters a photosensor 24 which produces an electric signal having a magnitude according to changes in the intensity or phase of the entered light beam. The electric signal thus represents the information recorded on the recording disc 20.

As mentioned above, the light source 10 and the concentrating lens 12 form a light path perpendicular to that of light passing through the object lens 22, the quater wave plate 18, the polarization prism 16 and the photosensor 24. Thus, the light source 10 and the concentrating lens 12 are necessarily largely apart from the light path through the object lens 22, the quarter wave plate 18, the prism 14 and the photosensor 24. It is now apparent that the prior art pickup device mentioned above is relatively large in construction thereby to make large the overall pickup device.

In order to solve this drawback in the prior art pickup device, there is provided a novel and improved pickup device according to the present invention as described hereinbelow.

DESCRIPTION OF THE PREFERRED EMBODIMENT

Figure 2:
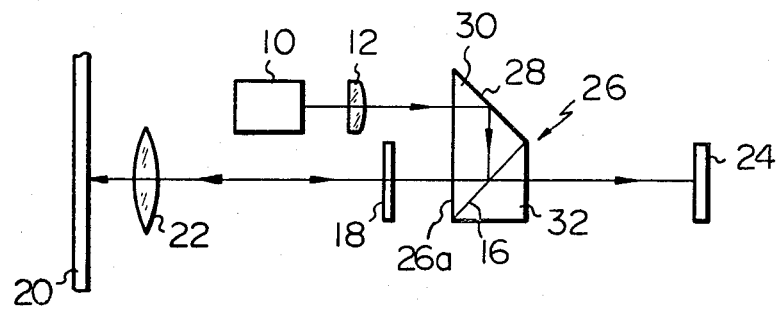
FIG. 2 is a schematic sectional side view of an embodiment of the present invention.

In FIG. 2 there is shown an optical pickup device according to the present invention which comprises a light source 10 which is preferably a semiconductor laser source emitting a plane-polarized light beam. The light beam from the light source 10 passes through a concentrating lens 12 and enters a prism 26 through a front surface 26a thereof. The surface 26a is perpendicular to the propagation direction of the light emitted from the light source 10. The light beam entered the prism 26 is reflected at an oblique reflecting surface 28 toward a polarizing plane or surface 16. The reflecting surface 28 and the polarizing plane 16 are both inclined from the front surface 26a by 45°, respectively, and perpendicular to each other. The front surface 26a, the reflecting surface 28 and the polarizing plane 16 are preferably so disposed that there exists such a plane as to be perpendicular to these surfaces 26a and 28 and the plane 16 and parallel to the propagation direction of the light beam emitted from the light source 10. The light source 10 is so disposed that the light emitted therefrom has a polarization direction parallel with the the light beam reflected by the reflecting surface 28 is further reflected by the polarizing plane 16 and passes through the front surface 26a. Because of such geometrical relationship between the surfaces 26a and 28 and the plane 16 as described above, the propagation direction of the light beam emitted from the light source 10 toward the reflecting surface 28 is parallel, but reverse in sense, to that of the light beam reflected from the polarization plane 16.

In this embodiment, the prism 26 preferably comprises two independent prism elements 30 and 32 respectively having cross sections of right-angled equilateral triangular shape. One side surface of the prism 30 is securely attached to an oblique surface, i.e. the hypotenuse of the other prism element 32 which forms the polarizing plane 16.

In the propagation path of the light reflected from the polarization plane 16 there is transversely positioned a quarter wave plate 18. This wave plate 18 is adapted to convert the plane-polarized light from the polarization plane 16 into a circularly polarized light, as already mentioned. The light beam passes through the quarter wave plate 18 is concentrated onto a recording surface of a recording disc 20 by means of an object lens 22.

On the recording surface there is formed a train of pits representing the information to be picked-up. While the disc 20 is rotated, the pickup device is so moved the recording surface of the disc 20 that the spot of light traces the train of pits. Thus, while the recording disc 20 is rotated, the incident strictly coherent light originated from the light source 10 is modulated by the train of pits of the disc 20 and is reflected back therefrom toward the polarizing plane 16 through the lens 22 and the plate 18.

The light beam reflected from the recording surface of the recording disc 20 is collimated by the object lens 22 and then passes through the quarter wave plate 18. The circularly polarized light beam returned from the disc 20 is reconverted by the quarter wave plate 18 into a plane-polarized light beam which is polarized in a direction shifted by 90° from the direction in which the original light beam emitted from the light source 10 is polarized so that the returned light beam passes through the polarization plane 16.

Thus, the polarizing plane 16 and the quarter wave plate 18 cooperate as a beam splitter in fact.

The light passed through the prism 26 enters a photosensor 24 which produces an electric signal having a magnitude according to changes in the intensity or phase of the entered light beam. The electric signal thus represents the information recorded on the recording disc 20.

Figure 3:
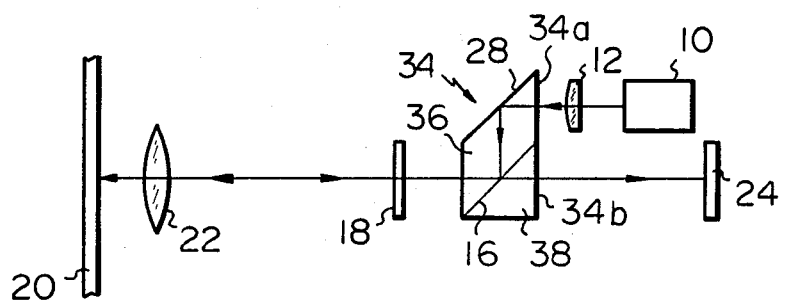
FIG. 3 is a schematic sectional side view of another embodiment of the present invention.

Whereas, the embodiment described above has a light source disposed opposite to the photosensor 24 with respect to the polarizer prism 26, a second embodiment as shown in FIG. 3 has a light source disposed in the same side with the photosensor with respect to the polarizer prism.

In the embodiment shown in FIG. 3, the polarizer prism 34 comprises two prism elements 36 and 38. The cross section of one of the two prism elements 36 is of a parallelogram having interior angles of 45° and 135°, while the cross section of the other prism element 38 is of a right-angled equilateral triangle. The prism element 38 is securely attached at its oblique surface forming a polarizing plane 16 to one side surface of the prism element 36 in such a manner that a side surface 34a, which is inclined from the plane 16 by 135°, of the parallelogram-shaped prism element 36 is registered in a level to a side surface 34b of the triangular prism element 38. In this embodiment, the light source 10 emits light toward the side surface 34a of the prism element 36 in a direction which is normal to the surface 34a and is reverse to the emission direction of the light source in the first embodiment as shown in FIG. 2. The embodiment shown in FIG. 3 is the same as the embodiment shown in FIG. 2 except the disposition of the light source and the construction of the polarization prism, and therefore no description will be given here with respect to the other parts.

It should be noted that the photosensor 24 and the assembly constituted by the light source 10 and the concentrating lens 12 are exchangeable with each other with respect to their positions in the two embodiments described above and shown in FIGS. 2 and 3. FIGS. 4 and 5 show other embodiments respectively corresponding to the embodiments of FIGS. 2 and 3, wherein the light source assembly 10, 12 and the photosensor 24 are replaced by each other.

As will be understood from the above description, in an optical pickup device according to the present invention the light source and the concentrating lens associated therewith can be so disposed that the light beam emitted from the light source propagates toward a polarizer prism in a direction substantially parallel to the path of light within the asssembly constituted by an object lens, a quarter wave plate, a a polarizer prism and a photosensor. Consequently, in accordance with the present invention, it is possible to accomodate all of the said members including the light source in a compact, generally cylindrical housing.

In addition, in an optical pickup device according to the present invention, the deviation of path of light due to the errors of mounting of the prism can be reduced, since, according to the present invention, the oblique reflecting surface 28 and the polarizing plane 16 of the prism are disposed parallel or perpendicular to each other.

It will be apparent that various changes and modifications may be envisaged by those skilled in the art without exceeding the scope of the present invention as claimed in the appended claims.

What is claimed is:

1. An optical pickup device for producing an electric signal representative of information recorded in the form of a light modulating pattern formed on a recording medium, which comprises: a light source (10) for emitting a plane-polarized light beam having a single polarizing plane; an object lens (22) positioned in the vicinity of said recording medium so as to focus a light beam applied thereto onto said recording medium in the form of a spot; a photo-electric transducer (24) for producing said electric signal in response to a light beam applied thereto; a quarter wave plate (18) positioned in the light path passing through said object lens (22) and said photo-electric transducer (24); and a single beam splitting prism (26,34) having a polarizing plane placed between said quarter wave plate (18) and said transducer (24) on said light path for directing said light beam supplied from said light source toward said quarter wave plate (18) and for allowing the light beam passed through said quarter wave plate (18) to pass therethrough toward said transducer (24) therein, said light source emitting said light beam toward said prism in a direction parallel to or along an optical axis passing through said object lens and said quarter wave plate, and said beam splitting prism having therein an inwardly reflective side surface (28) being inclined from said optical axis at an angle of 45° and inwardly reflective against an incident light thereto without respect to the polarization of said incident light.

2. An optical pickup device as defined in claim 1, wherein said beam splitting prism is comprised of a first prism element having said reflecting inside surface at a first side surface thereof and a second prism element attached at one of its side surfaces to a second side surface of said first prism element other than said first side surface and wherein said polarizing plane intervenes between said first side surface of said first prism element and said one of the side surfaces of said second prism element.

3. An optical pickup device as defined in claim 2, wherein said polarizing plane has such a polarizing property as to pass therethrough light polarized in a direction within a particular range with respect to the polarizing plane and to reflect light polarized in another direction within another range different from said particular range.

4. An optical pickup device as defined in claim 1, wherein said reflecting surface is inclined substantially at a right angle to said polarizing plane.

5. An optical pickup device as defined in claim 1, wherein said reflecting surface is substantially parallel with said polarizing plane.

6. An optical pickup device as defined in claim 1, wherein said beam splitting prism is comprised of a first prism element having a cross section of right-angled equilateral triangular shape and a second prism element contacting one of side surfaces of said first prism element so as to make said one side surface to be a polarizing plane.

7. An optical pickup device as defined in claim 1, wherein said beam splitting prism is comprised of a first prism element having a parallelogram-shaped cross section, and a second prism element contacting one of side surfaces of said first prism element so as to make said one of side surfaces to be a polarizing plane.

8. An optical pickup device as defined in claim 7, wherein said polarizing plane has such a polarizing property as to pass therethrough light polarized in a direction within a particular range with respect to the polarizing plane and to reflect light polarized in another direction within another range different from said particular range.

9. An optical pickup device as defined in claim 1, wherein said polarizing plane has such a polarizing property as to pass therethrough light polarized in a direction within a particular range with respect to the polarizing plane and to reflect light polarized in another direction within another range different from said particular range.

* * * * *